(12) United States Patent
Klein et al.

(10) Patent No.: US 7,433,098 B2
(45) Date of Patent: *Oct. 7, 2008

(54) DOCUMENT PROCESSING SYSTEM WITH IMPROVED IMAGE QUALITY ASSURANCE

(75) Inventors: Robert D. Klein, Farmington Hills, MI (US); Craig F. Lapan, Brighton, MI (US); George E. Reasoner, Jr., Tecumseh, MI (US)

(73) Assignee: Unisys Corporation, Blue Bell, PA (US)

( * ) Notice: Subject to any disclaimer, the term of this patent is extended or adjusted under 35 U.S.C. 154(b) by 809 days.

This patent is subject to a terminal disclaimer.

(21) Appl. No.: 10/837,344

(22) Filed: Apr. 30, 2004

(65) Prior Publication Data

US 2005/0243379 A1 Nov. 3, 2005

(51) Int. Cl.
*H04N 1/00* (2006.01)

(52) U.S. Cl. .................. 358/505; 358/403; 358/449; 358/453; 358/474; 358/488; 358/496; 382/305; 382/140; 382/190; 382/112; 382/209; 707/104.1; 707/7; 707/1

(58) Field of Classification Search ............... 358/3.27, 358/403, 305, 505, 1.16, 449, 453, 474, 496, 358/488; 382/254, 309, 112, 311, 305, 140, 382/190, 209; 707/104.1, 204, 7
See application file for complete search history.

(56) References Cited

U.S. PATENT DOCUMENTS 4,888,812 A * 12/1989 Dinan et al. ............... 382/140

| 5,537,483 | A | 7/1996 | Stapleton et al. | |
| 5,600,574 | A | 2/1997 | Reitan | |
| 5,832,140 | A | 11/1998 | Stapleton et al. | |
| 6,115,509 | A * | 9/2000 | Yeskel | 382/309 |
| 6,351,553 | B1 | 2/2002 | Hayosh | |
| 7,167,580 | B2 * | 1/2007 | Klein et al. | 382/112 |
| 2005/0244035 | A1 * | 11/2005 | Klein et al. | 382/112 |

* cited by examiner

*Primary Examiner*—King Poon
*Assistant Examiner*—Jamares Washington
(74) *Attorney, Agent, or Firm*—Richard J. Gregson; Robert P. Marley; Brooks Kushman PC

(57) ABSTRACT

A document processing system comprising an image capture subsystem for capturing selected image metrics and at least one image rendition from a plurality of documents and for determining if at least one of the selected image metrics for any of the at least one image rendition does not successfully compare against preselected image quality metric threshold values. An image quality flag is generated for any of the at least one image rendition if it does not successfully compare, and a record entry for each imaged document having at least one flagged image rendition is created in an image quality flag file. An image index file for individually accessing the image renditions is modified to include a reference to the corresponding image quality flag file record entry The document processing system may optionally compare selected document metrics against preselected document metrics in a similar manner. Image defects in the plurality of documents can be identified by examining the record entries in the image quality flag file.

17 Claims, 8 Drawing Sheets

| Offset | Length | Name |
|---|---|---|
| 0 | 128 | Annotation |
| 128 | 8 | FileName |
| 136 | 8 | FileDirectory |
| 144 | 100 | Parameter Settings |
| 244 | 264 | Reserved |
| 508 | 2 | Version |
| 510 | 2 | Checksum |

404

| Offset | Length | Name | |
|---|---|---|---|
| 0 | 1 | Create Image Quality Flags | 502 |
| 1 | 1 | Transport Type | 504 |
| 2 | 12 | Image Quality Enabled Flags | 506 |
| 14 | 2 | Minimum CCITT Compressed Packet Size | 508 |
| 16 | 2 | Maximum CCITT Compressed Packet Size | 510 |
| 18 | 2 | Minimum Aux CCITT Compressed Packet Size | 512 |
| 20 | 2 | Maximum Aux CCITT Compressed Packet Size | 514 |
| 22 | 2 | Minimum JPEG Compressed Packet Size | 516 |
| 24 | 2 | Maximum JPEG Compressed Packet Size | 518 |
| 26 | 2 | Minimum Aux JPEG Compressed Packet Size | 520 |
| 28 | 2 | Maximum Aux JPEG Compressed Packet Size | 522 |
| 30 | 1 | Minimum Document Height | 524 |
| 31 | 1 | Maximum Document Height | 526 |
| 32 | 1 | Minimum Document Length | 528 |
| 33 | 1 | Maximum Document Length | 530 |
| 34 | 62 | Reserved | 532 |

| Offset | Length | Name | |
|---|---|---|---|
| 0 | 4 | IDX Offset | 602 |
| 4 | 2 | Global Image Quality Conditions | 604 |
| 6 | 33 | Front 1 Image Quality Conditions | 606 |
| 39 | 33 | Rear 1 Image Quality Conditions | 608 |
| 72 | 33 | Front 2 Image Quality Conditions | 610 |
| 105 | 33 | Rear 2 Image Quality Conditions | 612 |
| 171 | 341 | Reserved | 614 |

| Offset | Length | Name |
|--------|--------|------|
| 0 | 1 | Global Image Quality |
| 1 | 1 | Partial Image |
| 2 | 1 | Excessive Image Skew |
| 3 | 1 | Piggyback Image |
| 4 | 1 | Too Light Or Too Dark |
| 5 | 1 | Streaks And Or Bands |
| 6 | 1 | Below Minimum Image Size |
| 7 | 1 | Exceeds Maximum Image Size |
| 8 | 1 | Reserved |
| 9 | 1 | Reserved |
| 10 | 1 | Reserved |
| 11 | 1 | Reserved |
| 12 | 1 | Reserved |
| 13 | 1 | Reserved |
| 14 | 1 | Reserved |
| 15 | 1 | Reserved |
| 16 | 1 | Reserved |
| 17 | 1 | Reserved |
| 18 | 1 | Reserved |
| 19 | 1 | Reserved |
| 20 | 1 | Reserved |
| 21 | 12 | Image Quality Bit Fields |

DOCUMENT PROCESSING SYSTEM WITH IMPROVED IMAGE QUALITY ASSURANCE

CROSS-REFERENCE TO RELATED APPLICATIONS

This application is related to:

U.S. patent application Ser. No. <TBD>, entitled "Image Quality Assurance Systems and Methodologies for Improving the Identification of and Access Speed to Image Quality Suspects in Documents" (Klein et al.), filed concomitantly herewith;

U.S. patent application Ser. No. <TBD>, entitled "Image File Arrangement for Use with an Improved Image Quality Assurance System," (Klein et al.), filed concomitantly herewith; and, U.S. patent application Ser. No. <TBD>, entitled "Image Quality Assurance Methodologies in a Post-Image Capture Document Processing Environment" (Klein et al.), filed concomitantly herewith;

all of which are incorporated by reference herein and assigned to the assignee of the present application.

BACKGROUND OF THE INVENTION

1. Field of the Invention

The present invention relates to imaging, and more specifically, to a document processing system with an improved image quality assurance methodology.

2. Background Art

On Jun. 6, 2003, the United States House of Representatives passed "The Check Clearing for the 21$^{st}$ Century Act." Following the passage of the House Bill, the United States Senate enacted on Jun. 27, 2003, S. 1334, "The Check Truncation Act of 2003." Both of these legislations are referred to informally as "Check 21" legislation. The law aims to improve the check and remittance payment systems by allowing banks, financial institutions, and remittance payment processors (e.g., utility and insurance companies) to exchange checks electronically instead of the current paper-based exchange. President George W. Bush signed the Check 21 legislation into law on Oct. 28, 2003, and when the law goes into effect on Oct. 28, 2004, a printed image of a check or remittance processing stub will have the same legal standing as its original paper counterpart.

Under current law, banking institutions must physically present and return the original paper checks received from customers and other accountholders. Within recent past years, banks, financial institutions, and remittance payment processors (e.g., utility and insurance companies) have been moving away from paper-based financial document processing environments toward image-based processing environments where images of checks and remittance processing stubs are used to perform data entry, correction and balancing operations. The adoption of such image-based document processing has yielded improvements in processing throughput and reduced labor costs.

The Check 21 law allows banks to voluntarily exchange electronic images over networks, legally acknowledging an electronic financial document as the legal equivalent of a paper financial document. In this check truncation environment, only images of the checks would be electronically transmitted between financial institutions and the paper documents would be held or destroyed by the bank of first deposit. Financial institutions desiring to continue processing paper could receive a substitute check, i.e., a paper reproduction created from an electronic image of the original check, for clearing and settlement and ultimate return to the accountholder. This substitute check would have the legal equivalence of the original paper check.

It is expected that the introduction of this law will allow a financial institution's customers to benefit from new products and services, such as online access to their check images. In addition, improved service is anticipated in view of the significantly reduced response time required for account information about checks, and avoidance of negative economic impacts is improved in view of the significantly reduced dependence on air transportation networks, which are vulnerable to expected or unexpected disruptions (such as strikes, weather, natural disaster, terrorist attacks or other types of crises). There is a 12-month implementation period, which began on Oct. 28, 2003, during which banks can roll out imaging technology and set up electronic exchanges with partner institutions.

In view of these changes, and in order to attempt to achieve an acceptable and accepted standard among the aforementioned institutions, the Accredited Standards Committee (ASC) for Financial Services (X9B) has drafted a proposed financial image interchange standard (*Specifications for Electronic Exchange of Check and Image Data,* DSTU X9.37-2003, currently under revision, hereinafter referred to as "the X9.37 standard") to support the exchange of check/document imagery between financial institutions. Although this standard has not been finalized or officially adopted, it has been provisionally selected by the Federal Reserve, the central bank of the United States.

However, one issue that arises with check truncation is the new requirement that some level of image quality assurance (IQA) be performed on the check images prior to image interchange between two financial institutions. The goal of IQA would be to provide some level of assurance that the check image renditions being created by the "sending" financial institution are of suitable quality and legibility to support follow-on financial document processing operations by the "receiving" financial institution.

In addressing this issue, the X9.37 standard has included the specification of a "minimum set" of image quality assurance (IQA) "flags" for each image being transmitted or exchanged. The purpose of these IQA flags is to identify questionable, or suspect, document images that might exhibit one or more image quality defects. Currently, the working definition of an "image quality defect" is some defect in the digital image rendition of the check that prohibits its use as a substitute for the original paper document during the payment process. It will be appreciated that such use prohibition may be defined according to the nature of subsequent processing that is to occur. For example, such prohibition might occur if the image does not meet the Check 21 requirement that the substitute check "accurately represents all of the information on the front and back of the original check as of the time the original check was truncated," or as indicated, infra, if the defect "can fatally compromise recognition of printed or written information by either intelligent character recognition (ICR) systems or by a data entry operator."

Typical image quality defects may include such items as: 1) Images of checks with folded corners (obscuring some portion of the document writing), 2) images of documents that are excessively skewed, perhaps causing the top portion of the image to be missing (outside the field of view of the image camera), 3) images that exhibit poor contrast or excessive brightness (reducing the legibility of the document), 4) images of two documents that are overlapped causing one document to be partially obscured, and 5) document images whose compressed image file sizes (in kilobytes) are too small or too large. In many cases, these defects in document image quality, albeit occasional, can fatally compromise recognition of printed or written information by either intelligent character recognition (ICR) systems or by a data entry operator.

It is therefore expected that those equipment vendors who supply image-enabled document processing platforms, as well as those who provide image-enabled document processing applications, will need to provide methods and systems to automatically perform image quality assurance for all images generated or created by their document processing platform/solution. It is envisioned that each document image will be tested for the presence of one or more image "defects", and these defects will be recorded and then stored with the image file/data prior to image interchange between the two banks.

In the past, companies have performed a variety of methods for automatically detecting image quality defects associated with the document image capture process. The automatic detection of image quality defects generally relies on defining a set of image metrics that can be used to infer probable image quality problems in a document image. Typical image metrics to assess image quality may include: image dimensional data (e.g., image height and width), compressed image packet size, image gray level histograms, image skew angle, hardware/software feed check errors, and other transport status/error detection information.

Recently, some companies have demonstrated a variety of methods for automatically detecting image quality defects associated with the document image capture process, and some advances have been made with regard to the automatic detection of image quality defects in document imaging platforms. However, the known image quality flag implementations currently being proposed by the vendors and the interchange standards committees (e.g., IBM and X9.37) involve the appending or embedding of image quality "lag" bits or data records directly into the existing check image file formats. Examples of the image quality flags set forth in the X9.37 standard are set forth in Appendix A. Although this methodology provides a vehicle for storing image quality flags for each document image, it does not provide a method for image-based document processing applications (e.g., check image processing applications) to quickly identify which images are suspected of containing one or more image quality defects.

Using such a method to store image quality flag data for each check image requires that a software application sequentially search/examine the image flag data records stored in each image file for the presence of one or more image quality flags following image capture. FIG. 1 illustrates such a typical IQA implementation scheme. As seen therein, as each document is imaged during the image capture process 100, one or more image rendition files are created at 102 for the front and rear of each document (i.e., a front image file (FIM) 104, a rear image file (RIM) 106, a second front image file (FI2) 108, a second rear image file (RI2) 110). Additionally, an image index file (IDX) 112 is created so that any of the aforementioned individual image files may be accessed by extracting the data stored in the IDX file 112. Finally, an end-of-file (EOF) semaphore file 114 is created to signal the completion of image capture processing for a batch of documents.

At least one image measure metric is determined at IQA metric generation process 118. Image measure metrics may be related to either the document processing and/or imaging hardware or the imaging software. Examples of hardware-related image measure metrics might include document image height and length, document skew, etc. Software-related image measure metrics might include compressed image packet size and front image dimensions compared to rear image dimensions.

Image quality flag (IQF) parameters such as discussed above and as set forth in Appendix A, and predetermined thresholds based on these parameters (120), are applied to image measures determined by the IQA metric generation process 118 at 122 in order to determine whether or not IQA flags (124) are to be set. If IQA flags are to be set, then they are embedded directly in the appropriate image files (i.e., FIM, RIM, FI2, RI2) at 126.

While this methodology may be sufficient for a small number of checks, it is not a particularly efficient method for use with large numbers of checks, particularly in view of the fact that the vast majority of check images do not have any quality defects present. As a result, this methodology results in the wasting of a large amount of application processing time examining image quality flag data where no defects are present. Furthermore, for those check image-processing platforms capable of generating multiple image renditions, e.g., black/white, full gray scale, full resolution, for the front and rear of each check document, the search for imagery containing image quality defects becomes even more complex and time consuming.

Therefore it would be desirable to provide for the realization of automated IQA on image platforms with improved access speed to image quality suspects, and particularly those implementing the X9.37 standard and its progeny.

SUMMARY OF THE INVENTION

It is, therefore, an object of the present invention to provide an improved document processing system.

It is another object of the present invention to provide improved image quality assurance systems and methodologies in a document processing system.

It is yet another object of the present invention to improve the identification of, and speed of access to image quality suspects in a plurality of imaged documents in a document processing system It is still another object of the present invention to improve the identification of, and speed of access to image quality suspects in documents that are imaged in a document processing system having an image platform that is compliant with the X9.37 financial image interchange standard and its progeny.

In a first aspect of the invention a document processing system is provided that includes a document transport for moving a plurality of documents and at least one computer running system software that interfaces with the document transport to provide document control. The document processing system further comprises: an image capture subsystem connected to the document transport for capturing selected image metrics and at least one image rendition from the plurality of documents as they are moved by the document transport. The image capture subsystem determines if at least one of the selected image metrics for any of the at least one image rendition does not successfully compare against preselected image quality metric threshold values and generates an image quality flag for any of the at least one image rendition if it does not successfully compare. The image capture subsystem creates in an image quality flag file, a record entry for each imaged document having at least one flagged image rendition, each record entry including information about the at least one flagged image rendition for that imaged document, whereby image defects in the plurality of documents can be identified by examining the record entries in the image quality flag file.

In a second aspect of the present invention, the document processing system comprises track hardware which provides selected document metrics from a plurality of documents as they are moved by the document transport. The image capture subsystem determines if at least one of the selected document metrics for any of the documents does not successfully compare against preselected document metric threshold values, generates an image quality flag for any of documents if it does not successfully compare, and creates in the image quality flag file, a record entry for each imaged document having at least one flagged document metric. Each record entry includes information about the at least one flagged document metric for that imaged document.

In a third aspect of the invention, the selected document metrics may include information about the type and information about the physical dimensions of each of the plurality of imaged documents. Such selected metrics may include a beam-of-light (BOL) "late" signal, a document spacing error signal and/or a double document signal.

In a fourth aspect of the present invention, at least one image rendition is captured and then stored according to type of image rendition. An image index file including a document record entry for each imaged document is created, the image index file for individually accessing any of the stored image rendition files and for indexing into any of the record entries in the image quality flag file. For each of the plurality of imaged documents, the image index file document record entry is modified to include a global image quality flag indicating that the imaged document has been examined for image defects.

In a fifth aspect of the present invention, for each of the plurality of imaged documents having at least one flagged image rendition, the image index file document record entry includes a reference to the image quality flag file record entry for the corresponding imaged document and a global image quality flag for that image index file document record entry is set, the global image quality flag indicating that the imaged document has been examined for image defects and at least one defect has been found.

Still other objects, features and advantages of the present invention will become readily apparent to those skilled in the art from the following detailed description, wherein there is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIG. 5 illustrates a preferred embodiment of the structure of the image quality metric thresholds in the header record of FIG. 4;

FIG. 6 illustrates a preferred embodiment of the structure of the image quality records of the image quality file (IQF) file of FIG. 3;

DETAILED DESCRIPTION OF THE PREFERRED EMBODIMENTS

Figure 1:
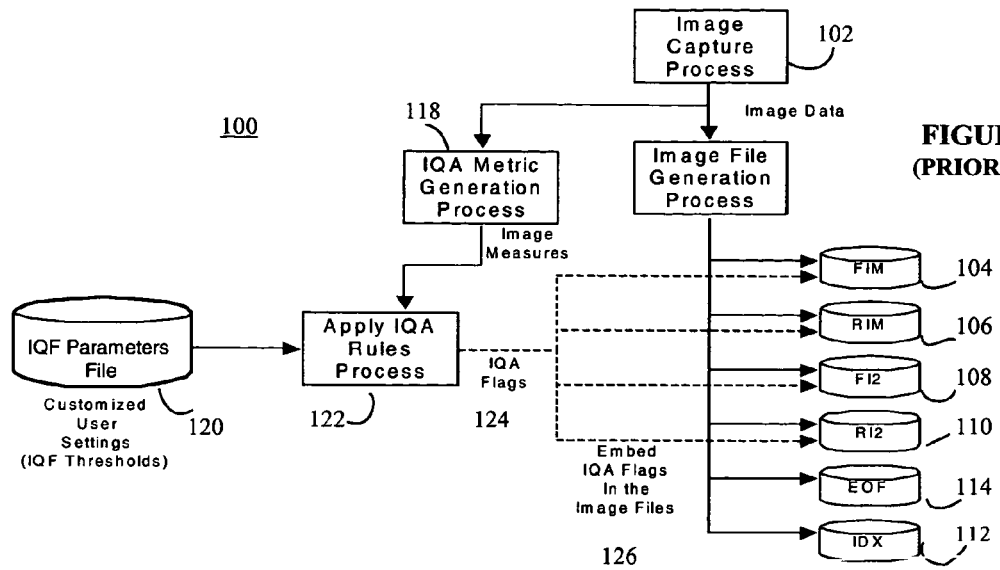
FIG. 1 illustrates a functional block diagram of a prior art image capture system with known image quality assurance (IQA)

Preferred features of selected embodiments of this invention will now be described with reference to the figures. It will be appreciated that the spirit and scope of the invention is not limited to the embodiments selected for illustration. For example, although the present invention will be described with reference to the X9.37 standard and its progeny, as this appears to be the preferred financial image interchange standard, it will be appreciated that the invention is not so limited and that is applicable to any automated image quality assurance implementation regardless of the image interchange standard that is ultimately adopted. Also, it should be noted that the drawings are not rendered to any particular scale or proportion. Finally, it is contemplated that any of the configurations and materials described hereafter can be modified within the scope of this invention.

As set forth above, although the proposed solutions to his problem have included appending or embedding of image quality "flag" bits or data records directly into the existing check image file formats, as discussed above, this is an inefficient use of time and application processing time, since the vast majority of check images do not have any quality defects present. There are other deficiencies with these proposed methodologies as well.

For example, certain types of image defects are independent of the image representation (e.g., black/white vs. full gray scale). Examples may include: 1) Images of documents that have one or more folded or torn corners, 2) images of documents where the document is skewed, and 3) images of overlapped or "piggybacked" documents. In these scenarios, the same image quality flag(s) will be "set" independently of the image rendition, since the defect will show up in all images of that document. Currently known systems and methods such as that of FIG. 1, where image quality flags are stored for each image file independently do not provide any method to consolidate "common" image defects for each document independent of the image renditions being generated.

In addition, currently known methods do not allow for the easy detection of "temporal" image quality defects—i.e., defects that may only affect a subset of a number of documents, or a subset of a batch of documents, and then resolve itself over a period of time. One type of "temporal" image defect is the presence of horizontal "streaks" in the document image due to dirt on the digital camera's scan window or optics. In many cases the dirt is present in the camera system's field of view for only for a short period of time and is eventually removed by the wiping action of the paper documents against the scan window. This type of image quality defect will cause a sequence or range of check images to exhibit the same image quality defect. As known methods such as that disclosed in FIG. 1 store the image quality flags specific to a document image within the image file, versus a range or batch of documents, the method does not provide direct support for identifying temporal image quality defects.

Furthermore, as check processing is normally performed by partitioning documents into "batches" in order to facilitate processing workflows and balancing operation, most image-enabled document processing application software involves the processing of batches of checks. Neither the aforementioned proposed method nor other known methods provide a consolidated summary of image quality defects associated with the batch of images that have been captured/imaged.

Finally, none of the known IQA methodologies allow for storing the criteria used to determine the value of each image quality flag (i.e., whether the flag is set or not). The values of image quality flags are generally determined by comparing some image measurements (or metrics) against some set of rules that compare the metric(s) to one or more parameter settings. As an example, the compressed image file size (in kilobytes) can be compared to a "maximum" or "minimum" image file size parameter. The result of the comparison (i.e., whether the compressed image file size is greater than, less than, or equal to the "maximum" or "minimum" image file size parameter) will be used to determine whether the "image file size defect flag" is set. Prior IQA methodologies such as shown in FIG. 1 do not provide information on the parameters used in determining the state of each image quality flag.

Automated Image Quality Assurance (IQA)

An embodiment of the automated image quality assurance (IQA) system and method of the present invention that addresses all of the aforementioned shortcomings of prior known IQA methodologies will now be discussed with reference to FIG. 2.

The image capture document processing system 200 begins at 202 with an image capture process 202. As known to those skilled in the art, as each document in a batch of documents is imaged, one or more image renditions, e.g., JPEG and CCITT Group 4, are preferably created at 202 for the front and rear of each document and then stored to separate files, e.g., a front image file (FIM) 206, a rear image file (RIM) 208, a second front image file (FI2) 210, a second rear image file (RI2) 212, by the image file generation process 204. (Although preferably image renditions are generated for both sides of a document, it will be appreciated that in certain image processing platforms, image renditions may be generated only for one side of the document). It will be understood by those skilled in the art that any image capture process 202 and image file generation process 204 may be used, and as such processes are well-known to those skilled in the art, no further discussion is needed.

An image index file (IDX) 214 is created so that any of the aforementioned individual image files may be accessed by extracting the data stored therein. Finally, an end-of-file (EOF) semaphore file 216 is created to signal the completion of processing for a batch of documents Image data generated from the image capture process 202 for each image is then analyzed by the IQA metric generation process 218 to provide selected image metrics which may be used to assess image quality of the captured images. As discussed above, these image metrics may include any or all of the following: image metric data, e.g., height and width; compressed image packet size; image gray level histograms; uncompressed image data; image skew angle; hardware/software feed check errors; and/or other transport status/error detection information, and may be used alone or in any combination thereof to generate specific image quality "flags" (discussed in more detail below). Other image metrics that are known to those skilled in the art may also be included in the IQA metric generation process 218.

In accordance with one embodiment of the present invention, an optional document metrics process 220 provides relevant information about the type and physical dimensions of the documents being processed. Examples of document measure metrics may include beam-of-light (BOL)-"late" signal, document spacing error, double document, and similar document measures. This information may be obtained from track control PC 804 (FIG. 8), or track control logic and sensors (not shown) located in the document transport (e.g., document processor track hardware 802 (FIG. 8)). The optional document metrics process 220 might be used if image quality assurance is performed in real-time during image capture; however, the information provided by this process 220 would not be available in post-capture implementations of the present invention.

For each image quality defect to be detected, one or more of the image metrics generated by the IQA Metric Generation Process 218 and, optionally, the document metrics provided by the Document Metrics Process 220 are then compared at IQA Rules Process 222 against a selected image quality metric setting or threshold, or some combinations of image quality metric thresholds, from an IQF Parameter File 224 in order to determine whether a particular image metric "passed" or "failed." The IQF Parameter File 224 is preferably generated prior to the start of the image capture process 202, preferably by an image quality configuration application that provides a human interface to display and modify the image quality settings and thresholds. The IQF Parameter File 224 includes at least customized image quality metric thresholds that have been predefined or preselected (e.g., by the manufacturer, the user, or a third party value-added reseller) and is preferably stored in an image capture server PC (e.g., ICS PC 810 in FIG. 8) as an image quality flag initialization file (IQF.INI) (discussed with reference to FIG. 8 below).

At the beginning of each batch of documents, an IQF file 230 is created with an associated IQF header record 306 (see, FIG. 3) that contains the image quality metric thresholds from the IQF Parameter File 224. Should the image data for any of the captured document images fail the predefined image quality metric threshold test (e.g., not equal or exceed the threshold) at 222, an IQA "flag" (226) will be generated. This flag 226 will, in turn, be used to generate at IQF Record Generation Process 228 a record entry in an IQF file 230. The IQF Record Generation Process 228 creates in IQF file 230 a record entry for each document in the batch that is suspected of having an image quality defect (i.e., one or more image quality flags 226 have been "set" for one or more of the image renditions associated with that document). Therefore, if five documents in a batch have been flagged as having suspect image quality (on one or more image renditions), five record entries will be placed into the IQF file 230 for that batch of images. The record entries in the IQF file 230 in turn contain image index information pointing to the suspect document in the image index file (IDX) 214 along with all the image quality flags associated with each image rendition of that document (e.g., CCITT, JPEG). In addition, IQF Record Generation Process 228 will indicate that image quality was checked for that document, and that it has a corresponding "flagged" IQF file record, by initializing a field in record 310 for that document before record 310 is written to the image index file (IDX) 214. Preferably, this is done by setting a global IQA flag 300 in the document record 310 before record 310 is written to image index file (IDX) 214. In addition, image quality record index field 302 will be initialized to include a reference to the corresponding record entry in the IQF file 230. Further details regarding the format of the IQF file 230 and IDX file 214 will be discussed below with reference to FIG. 3.

The IQF flags and parameters 304 for that batch of documents are then stored at 230 for later retrieval of image quality suspects, and the image index file (IDX) 214 is preferably modified to indicate that image quality has been checked for that batch of documents. Image quality information is made accessible to a document imaging application (not shown) by having the document imaging application "scan" only those record entries present in the IQF file 230 after the batch is released (via the EOF file semaphore 216). Further discussion of the retrieval of images having suspect image quality will be discussed with reference to FIGS. 10 and 11.

In a preferred embodiment of the present invention, if the imaging hardware or software used to carry out the image capture process 202 does not support detection of particular imaging quality metrics, the image capture process 202 will automatically amend IQF Parameter File 224 to disable the detection for these imaging quality metrics. (discussed in more detail with reference to FIG. 5 below)

Optionally, if a user is not interested in conducting image quality assurance for a particular batch of documents, the IQF file 230 can be ignored by the document imaging application. This is preferably accomplished through parameter settings located in the image parameters initialization file of IQF Parameter File 224 (discussed below). It will be appreciated that this allows the benefit of the addition or exclusion of an IQF file that in no way impacts those current document imaging applications that use the existing image file structures (IDX, FIM, FI2, RIM, RI2, etc.). Thus the automated image quality assurance of the present invention can be conducted without modification of document imaging applications.

IQF File Structure and Modified IDX File Structure

Modified IDX File Structure

Figures 3, 4:
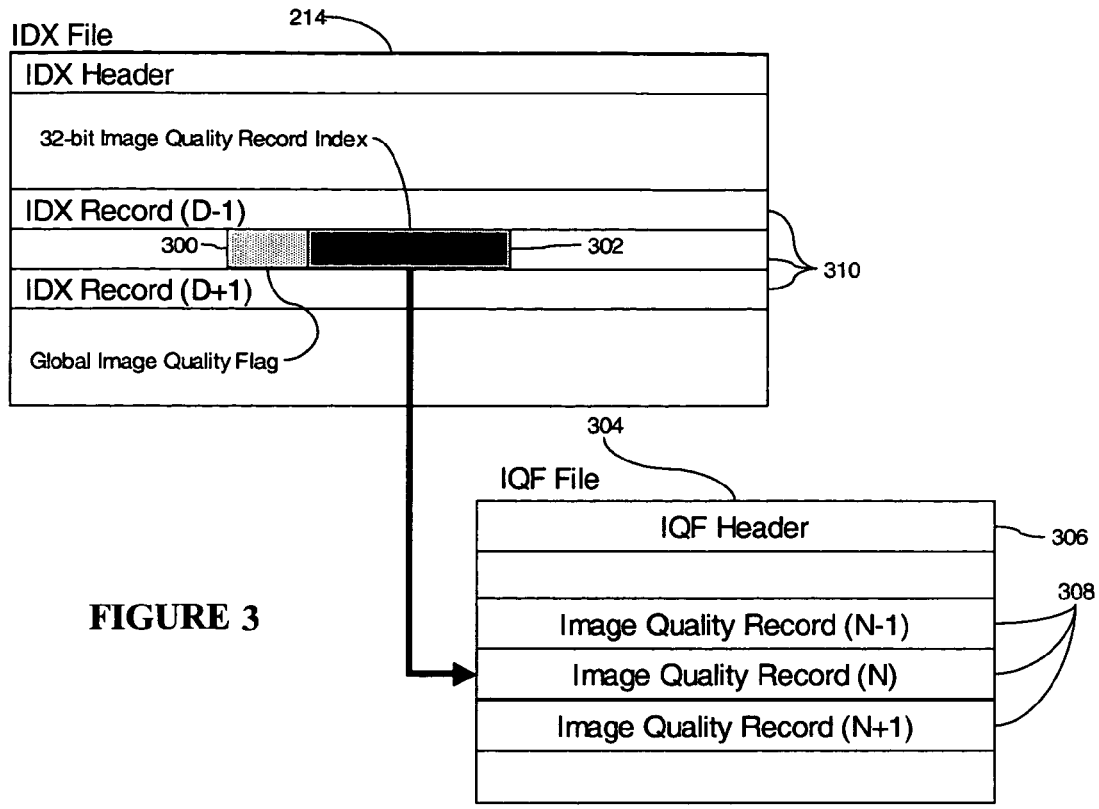
FIG. 3 illustrates a preferred embodiment of the file structure of an image quality file (IQF) for use with the image capture system with image quality assurance (IQA) of FIG. 2 and the present invention and a modified IDX record structure for indexing to selected records in the image quality file (IQF) file.
FIG. 4 illustrates a preferred embodiment of the file structure of the header record of the image quality file (IQF) file of FIG. 3.

In accordance with a preferred embodiment of the present invention, and with reference to FIG. 3, the file structure of image index file IDX 214 is modified such that each IDX record 310 contains a single "global" image quality flag 300 and image quality record index field 302. Preferably, the "global" image quality flag 300 comprises one byte and is at a location in each IDX record 310 in the image index file IDX 214 that was reserved in previously created versions of the IDX file 214. In addition, the image quality record index field 302 preferably comprises a 32-bit (4-byte) record field at locations that were reserved in previously created versions of the IDX file 214.

As set forth above, the "global" image quality flag 300 is used to indicate whether image quality was checked for a document and, if so, whether one or more image renditions "failed" the image quality tests. In one embodiment, a value of zero (0) is used to indicate that the document was not checked for image quality, and a non-zero value is used both to indicate that it was checked and to represent whether it passed or failed (e.g., 1=failed, on one or more image renditions, 2=passed). Of course, it will be understood that any other similar representations may be used to provide this same information.

The image quality record index field 302 is used to point to (i.e., index into) the appropriate record 308 in the IQF file 304 that contains the document that has one or more image quality errors. The particular one of the image quality record entries 308 (pointed to by the image quality record index field 302) will then contain the image quality flag data for all image renditions associated with the document.

IQF File Structure—Header Structure

Referring to FIGS. 3 and 4, IQF file 304 comprises a header record 306 that contains at least the parameter settings 404 for the "pass/fail" criteria associated with each image quality flag (i.e., the image metric threshold values extracted from the IQF Parameter File 224). In addition, in one embodiment of the present invention, the IQF header record 306 includes image file set information 402, reserved fields 406 to allow for additional data in future implementations of image quality assurance, the particular version level of the IQA being used 408, and a checksum field 410 to allow verification that the IQF header record data has not been corrupted. In one embodiment, the IQF header record 306 comprises 512 bytes.

The parameter settings 404 that are extracted from the IQF parameter file 224 (e.g., IQF.INI) preferably include those fields as seen in FIG. 5. In one embodiment, the parameter settings 404 comprise 100 bytes of the IQF header record.

Referring to FIG. 5, field 502 is an image quality parameter field that can be "toggled" to allow a user or a value-added reseller of imaging applications to disable the creation of image quality flags if, for example, the user is not interested in conducting image quality assurance for a particular batch of documents. Again, this allows the benefit of the addition or exclusion of an IQF file without impacting/modifying the value-added reseller's (or other user's) current document imaging applications that use the existing image file structures (IDX, FIM, FI2, RIM, RI2, etc.).

In the case of document-processing applications, field 504 is preferably used to delineate the type of document transport that was used to generate the imagery that is undergoing IQA analysis. Field 506 includes a series of bits that define the image quality flags that have been enabled by the software and/or hardware on which the image quality assurance system of the present invention is running. One embodiment of the bit string definitions for field 506 is shown in Table I below:

TABLE I

| Bit | Description |
|---|---|
| Bit 0: Enable X9.37 "Partial Image" | 0 = Do not test for a partial image condition.<br>1 = Set the "Partial Image" Quality Flag when a partial image condition is detected. |
| Bit 1: Enable X9.37 "Excessive Image Skew" | 0 = Do not test for excessive image skew.<br>1 = Set the "Excessive Image Skew" Quality Flag when an excessive image skew condition is detected. |
| Bit 2: Enable X9.37 "Piggyback Image" | 0 = Do not test for piggyback image condition.<br>1 = Set the "Piggyback Image" Quality Flag when a piggyback image condition is detected. |
| Bit 3: Enable X9.37 "Too Light Or Too Dark" | 0 = Do not test for too light or too dark conditions.<br>1 = Set the "Too Light Or Too Dark" Quality Flag when a too light or too dark condition is detected. |
| Bit 4: Enable X9.37 "Streaks And Or Bands" | 0 = Do not test for streaks and/or bands.<br>1 = Set the "Streaks And Or Bands" Quality Flag when streaks and/or bands are detected. |
| Bit 5: Enable X9.37 "Below Minimum Image Size" | 0 = Do not test for minimum image size<br>1 = Set the "Below Minimum Image Size" Quality Flag when an image size is below an acceptable value, as defined by the "Minimum Compressed Packet Size" Image Quality Threshold for this image rendition. |
| Bit 6: Enable X9.37 "Exceeds Maximum Image Size" | 0 = Do not test for maximum image size.<br>1 = Set the "Exceeds Maximum Image Size" Quality Flag when an image size is above an acceptable value, as defined by the "Maximum Compressed Packet Size" Image Quality Threshold for this image rendition. |
| Bits 7-19: X9.37 Reserved | 0 = Reserved for emerging X9.37 image quality technologies. |

It will be appreciated that bits 0-6 of image quality enabled flags 506 comprise image quality flags as defined under the X9.37 standard, while bits 7-19 are for the reserved X9.37 image quality flags. It also will be appreciated that the particular order of the bits within the bit string, and the length of both the bits and bit string, are merely exemplary. Preferably, these image quality enabled flags are set to zero "0" if no image quality conditions are to be reported for any image rendition of the document, and to one "1" if the image quality condition is to be reported. One skilled in the art will appreciate that these settings are merely exemplary and any similar flag settings may be used instead to represent the testing requirements for the image renditions.

However, in a preferred embodiment of the present invention, the image quality enabled bit flags 506 comprise an additional 76-bits as shown in Table II below, for a total of 96-bit (12-byte) string. These additional image quality flags have been defined by Unisys Corporation, the assignee of the present invention, and are based on measures generated by its NDP platform software and/or hardware (discussed in more detail below). Again, the particular order of the bits within the bit string, and the length of both the bits and bit string, are merely exemplary:

TABLE II

| Bit | Description |
|---|---|
| Bit 20: Enable Unisys "Feed-check" | 0 = Do not test for feed-check conditions.<br>1 = Set the "Feed-check" Quality Flag when a feed-check condition is detected (NDP850-NDP2000 transports only). |
| Bit 21: Enable Unisys "BOL Late" | 0 = Do not test for BOL Late conditions.<br>1 = Set the "BOL Late" Quality Flag when a BOL Late condition is detected. |
| Bit 22: Enable Unisys "Framing Error" | 0 = Do not test for framing error conditions.<br>1 = Set the "Framing Error" Quality Flag when a Framing Error condition is detected. |
| Bit 23: Enable Unisys "Below Minimum Document Height" | 0 = Do not test for minimum document height.<br>1 = Set the "Below Minimum Document Height" Quality Flag when an image document height is below an acceptable value, as defined by the "Minimum Document Height" Image Quality Threshold. |
| Bit 24: Enable Unisys "Exceeds Maximum Document Height" | 0 = Do not test for maximum document height.<br>1 = Set the "Exceeds Maximum Document Height" Quality Flag when an image document height is above an acceptable value, as defined by the "Maximum Document Height" Image Quality Threshold. |
| Bit 25: Enable Unisys "Below Minimum Document Length" | 0 = Do not test for minimum document length.<br>1 = Set the "Below Minimum Document Length" Quality Flag when an image document length is below an acceptable value, as defined by the "Minimum Document Length" Image Quality Threshold. |
| Bit 26: Enable Unisys "Exceeds Maximum Document Length" | 0 = Do not test for maximum document length.<br>1 = Set the "Exceeds Maximum Document Length" Quality Flag when an image document length is above an acceptable value, as defined by the "Maximum Document Height" Image Quality Threshold. |
| Bits 27-95: Unisys Reserved | Reserved for emerging Unisys image quality technologies. |

In the preferred embodiment of the present invention, if an X9.37 flag bit is enabled that requires additional image quality conditions to be detected in order to effect the detection of that particular image quality metric, the image capture software will automatically enable the corresponding platform-specific image quality enabled flags. For example, when the X9.37 "partial image" image quality flag is enabled (e.g., bit 0 in Table I), the image capture software will enable the Unisys "beam of light (BOL) late" (e.g., bit 21 in Table II) and "framing error" (e.g., bit 22 in Table II) image quality flags.

In addition, as set forth above, if the hardware or software used to carry out the image quality assurance of the present invention does not support the detection of any of the particular imaging quality metrics, image capture software can disable in this field the corresponding image quality enabled flag bit. It will be appreciated from Table I that selected bits (i.e., bits 7-19) may be reserved for emerging X9.37-related image quality technologies. Similarly, selected bits (i.e., bits 27-95) may be reserved for emerging image quality technologies being developed by Unisys Corporation, the assignee of the present invention. It will be appreciated however, that the reserved bits are optional and not mandatory in the present invention.

Finally, parameter settings 404 include fields 508 through 532, which comprise the customized image quality metric thresholds that have been previously defined or preselected (e.g., by the transport manufacturer or a value-added reseller of imaging applications). These image quality metric thresholds are preferably only set if the corresponding image quality enabled flag bits (e.g., as shown in TABLE I) are enabled. Examples of the customized image quality metric thresholds may include minimum CCITT compressed packet size, maximum CCITT compressed packet size, minimum JPEG compressed packet size, maximum JPEG compressed packet size, minimum document height, maximum document height, minimum document length, and maximum document length. It will be appreciated that additional metric thresholds may be included depending upon the hardware and software on which the image quality assurance of the present invention is running. For example, in the case were the image capture process 202 is carried out using a dual filter camera, additional thresholds may include minimum auxiliary CCITT compressed packet size, maximum auxiliary CCITT compressed packet size, minimum auxiliary JPEG compressed packet size, and maximum auxiliary JPEG compressed packet size. Field 534 preferably includes expansion bits to allow for the addition of future image quality metric thresholds as they are developed or become available (although this is not required in the present invention).

IQF File Structure—"Record" Structure

After image header record 306, an image quality "record" 308 may be generated for IQF file 304. As discussed above, an image quality record 308 is only generated for each document D having one or more image quality errors for any and all image renditions for that document D. Preferably, each image quality record 308 is 512 bytes in order to allow for future expansion and emerging image conditions (although this is not required in the present invention). A preferred embodiment of the structure of an image quality record 308 in IQF file 304 is shown in FIG. 6.

Figures 7, 9:
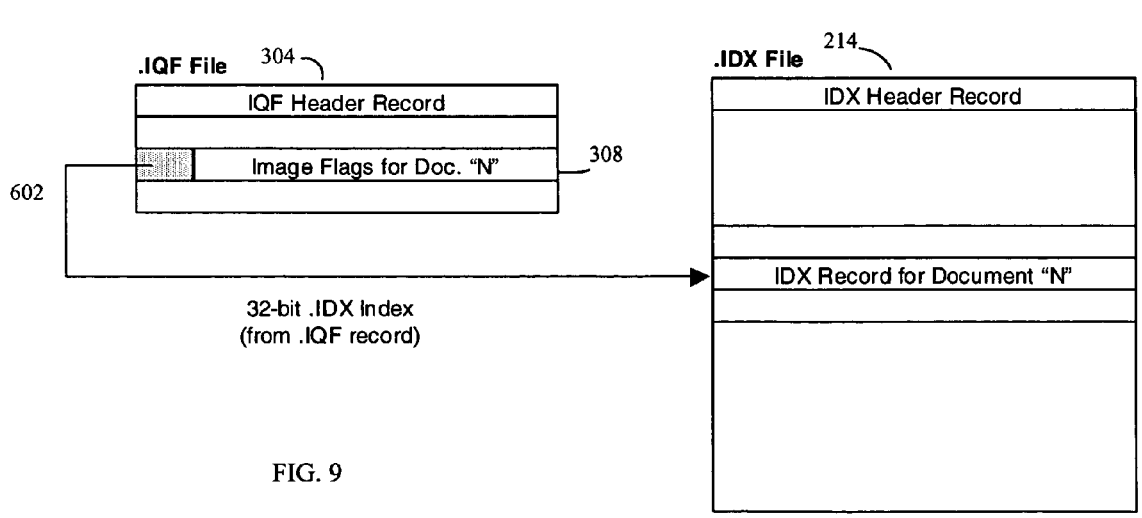
FIG. 7 illustrates a preferred embodiment of the structure of the image quality conditions of the image quality records of FIG. 6.
FIG. 9 illustrates a preferred embodiment of the retrieval of "suspect" images using the IDX file and IQA file of FIG. 3 and image quality record structure of FIG. 6.

Image quality record 308 for a document D preferably includes an IDX offset "field" 602 that defines the offset of that document in the IDX file. The IDX offset field defines the beginning of the document record in the IDX file that can be used to retrieve the images associated with document D, as shown in FIG. 9. After IDX offset "field" 602, global image quality condition "field" 604 preferably includes a bit string indicating the image renditions (e.g., FIM, RIM, FI2, RI2) that have reported image quality conditions.

In one embodiment of the present invention, global image quality condition "field" 604 includes a 16-bit (2 byte) string as defined in Table III below, although it will be appreciated that the particular order of the bits within the bit string, and the length of both the bits and bit string, are merely exemplary:

TABLE III

| Bit | Definition |
|---|---|
| Bit 0: Front 1 Image Quality (FIM) | 0 = No image quality conditions were reported for the 1st "front image" rendition of the document. 1 = One or more image quality conditions were reported for the 1st "front image" rendition of the document. |
| Bit 1: Rear 1 Image Quality (RIM) | 0 = No image quality conditions were reported for the 1st "rear image" rendition of the document. 1 = One or more image quality conditions were reported for the 1st "rear image" rendition of the document. |
| Bit 2: Front 2 Image Quality (FI2) | 0 = No image quality conditions were reported for the 2nd "front image" rendition of the document. 1 = One or more image quality conditions were reported for the 2nd "front image" rendition of the document. |
| Bit 3: Rear 2 Image Quality (RI2) | 0 = No image quality conditions were reported for the 2nd "rear image" rendition of the document. 1 = One or more image quality conditions were reported for the 2nd "rear image" rendition of the document. |
| Bits 4-15: Reserved | Reserved for future image renditions. |

In a preferred embodiment, bits 4-15 are reserved for future image renditions such as region-of-interest images or alternate compression schemes. Preferably, these global image quality condition flags are set to zero "0" if no image quality conditions were reported for the particular image rendition of the document, and to one "1" if one or more image quality conditions were reported. One skilled in the art will appreciate that these settings are merely exemplary and any similar flag settings may be used instead to represent the testing results of the image renditions.

Image quality record 308 for a document D also preferably includes image quality conditions 606, 608, 610 and 612. Image quality conditions 606, 608, 610 and 612 include specific information regarding the presence and type(s) of image quality conditions that are generated for any and all image renditions for that document D and comprise separate "sub-records" for each of the image renditions of a document. Image file generation process 204 populates those sub-records for which a corresponding image rendition exists for document D. Thus, for example, if image file generation process 204 generates a FIM image rendition, image quality record 308 will populate a Front 1 image quality conditions sub-record 606; if image file generation process 204 generates an RIM image rendition, image quality record 308 will populate a Rear 1 image quality conditions sub-record 608; if image file generation process 204 generates an FI2 image rendition, image quality record 308 will populate a Front 2 image quality conditions sub-record 610; if image file generation process 204 generates an RI2 image rendition, image quality record 308 will populate a Rear 2 image quality conditions sub-record 612, and so on. Each of these image quality conditions sub-records, in turn, preferably includes specific information about a particular type(s) of image quality condition(s) (if any) that was generated at IQA rules process 222 for that particular image rendition. A preferred embodiment of the structure of these generated conditions 606, 608, 610 and 612 may be understood with reference to FIG. 7 (discussed below). Finally, image quality "record" 308 for a document preferably includes reserved bytes 616 in order to allow for future expansion and emerging image conditions (although this is not required in the present invention).

FIG. 7 shows a preferred embodiment of the structure of any of the image quality conditions sub-records 606, 608, 610 and 612 of the image quality record 308. Each image quality conditions sub-record structure 700 includes a global image quality flag 702, which is preferably an ASCII code that indicates whether the particular image rendition was tested for any of the conditions including those related to X9.37 image quality definitions such as set forth in Appendix A, and, if so, whether any image quality suspect errors were reported. In a preferred embodiment, a tri-stated flag 702 is set to zero "0" if the image was not tested for any of the image quality conditions, one "1" if the image was tested and one or more image quality conditions were reported, or two "2" if the image was tested and no image quality conditions were reported. One skilled in the art will appreciate that these settings are merely exemplary and any similar flag settings may be used instead to represent the testing results of the image renditions.

Following global image quality flag 702, image quality conditions sub-record structure 700 sets forth a number of specific suspect image quality conditions 704 that may be generated for the particular image rendition during IQA process rules 222 when some aspect of the image does not pass the predefined threshold set forth in IQF parameter file 224 and image quality bit fields 708, which preferably include at least the bit fields set forth in Tables V and VI below. Each of the suspect image quality conditions 704 preferably comprises an ASCII code, while the image quality bit fields 708 preferably comprises a bit string. The suspect image quality conditions 704, and image quality bit fields 708 in conjunction with the image quality enabled flags 506 (FIG. 5), are used to indicate whether a particular image rendition was tested for a specific image quality condition and, if so, whether the specific image quality condition was detected.

More specifically, as set forth above, image quality enabled flags 506 preferably comprise a bit string that defines the image quality flags that have been enabled by the software and/or hardware on which the image quality assurance system of the present invention is running. Thus for each image quality condition to be tested, the corresponding bit in image quality enabled flags 506 indicates whether the images were tested (enabled) for that condition. The corresponding bit in 708 is then also set to indicate whether the condition was detected, if the image was tested for the condition. Finally, image quality conditions 704 are a combination of the states of a subset, which may include the entire set, of the image quality enabled flags 506 and corresponding bits 708, and are used to indicate whether the test was conducted for the specific suspect image quality condition, and if so, whether the condition was present. Image quality conditions 704 are preferably represented as a tri-state ASCII code, as further discussed below.

As set forth above, in one embodiment of the present invention, the image quality enabled flags 506 are set to zero "0" to indicate that no image quality conditions are to be reported for any image rendition of the document, and to one "1" to indicate that the image quality condition is to be reported. In this embodiment, the corresponding bit 708 is preferably set to one "1" if the condition was tested and is present, and set to zero "0" otherwise (i.e., the condition was not tested or the condition was tested, but not present). The resulting image quality conditions 704 are then preferably indicated in ASCII code as follows in Table IV:

TABLE IV

| State of Condition | 506 | 708 | 704 |
|---|---|---|---|
| Condition not tested | 0 | 0 | "0" |
| Condition tested, and detected | 1 | 1 | "1" |
| Condition tested, but not detected | 1 | 0 | "2" |

Thus, in this embodiment, the ASCII code bits are set to the code representing the character zero "0" if a test for the specific suspect image quality condition was not conducted, the code representing the character one "1" if the test was conducted and the specific suspect image quality condition is present, or the code representing the character two "2" if the test was conducted and the specific suspect image quality condition was not present. Of course, one skilled in the art will appreciate that these settings are merely exemplary and any similar encodings may be used instead to represent the testing results of the image renditions. Further, it will be understood by those skilled in the art that as the EBCDIC character set is the preferred encoding set forth in the X9.37 standard, it may be used instead of ASCII.

The "list" of suspect image quality conditions 704 preferably includes the following: "Partial image" condition (which indicates whether only a portion of the image rendition is represented digitally with the other portion is suspected of being either missing or corrupt); "excessive document skew" condition (which indicates if the image skew exceeds an acceptable value, such value generally being specific to defined requirements and/or constraints in an imaging application); "piggyback image" condition (which indicates that the image rendition may be extended, obscured, or replaced by the image(s) of additional document(s), which may occur when two or more documents are fed together and captured as one document); "too light or too dark image" condition (which indicates if the image is too light or too dark. The value of this condition is generally specific to the defined requirements and/or constraints in an imaging application); "streaks and or bands" condition (which indicates if the image is likely corrupted due to streaks and/or bands, such as might be caused by dirt, dust, ink, or debris on a lens or in the optical path); "below minimum image size" condition (which indicates if the size of the compressed image is below an acceptable value, generally being defined or constrained by the imaging application, and which is further defined by the "minimum compressed packet size" image quality threshold); and, "exceeds maximum image size" condition (which indicates if the size of the compressed image is above an acceptable value, generally being defined or constrained by the imaging application, and which is further defined by the "maximum compressed packet size" image quality threshold).

In one embodiment of the present invention, image quality conditions sub-record structure 700 also includes additional reserved bytes 706 to allow for future expansion an emerging image conditions (although this is not required in the present invention). As shown in FIG. 7, the number of reserved bytes matches the number of reserved image quality information fields in the X9.37 standard. As shown in FIG. 7, the number of bytes may be thirteen (13).

Image quality bit fields 708 preferably include at least the bit fields set forth in Table V. Image quality bit fields 708 can be used to more rapidly evaluate if any of a multiplicity of enabled conditions were detected for an image rendition; i.e., without having to examine each of the ASCII image quality conditions 704.

It will be appreciated that bits 0-6 of image quality bit fields 708 reflect image quality conditions 704, while bits 7-19 reflect image quality conditions 706. It also will be appreciated that the particular order of the bits within the bit string, and the length of both the bits and bit string, are merely exemplary:

TABLE V

| Bit | Description |
|---|---|
| Bit 0: Partial Image Flag | 0 = Entire image is present, or condition not tested. |
| | 1 = Portion of the image is suspected to be missing. |
| Bit 1: Excessive Document Skew Flag | 0 = Image skew does not exceed an acceptable value, or condition not tested. |
| | 1 = Image skew exceeds an acceptable value. |
| Bit 2: Piggyback Image Flag | 0 = Piggyback condition not present, or not tested. |
| | 1 = Piggyback condition present. |
| Bit 3: Too Light or Too Dark Flag | 0 = Too Light or Too Dark condition not present, or not tested. |
| | 1 = Too Light or Too Dark condition present. |
| Bit 4: Streaks and/or Bands Flag | 0 = Streaks and/or bands not detected, or not tested. |
| | 1 = Streaks and/or bands detected.. |
| Bit 5: Below Minimum Image Size Flag | 0 = The compressed image is not below an acceptable value, or condition not tested. |
| | 1 = The compressed image is below an acceptable value. |

TABLE V-continued

| Bit | Description |
| --- | --- |
| Bit 6: Exceeds Maximum Image Size Flag | 0 = The compressed image is not above an acceptable value, or condition not tested.<br>1 = The compressed image is above an acceptable value. |
| Bits 7-19 | 0 = Reserved |

However, in a preferred embodiment of the present invention, the image quality bit fields 708 comprise an additional 76-bits as shown in Table VI below, for a total of 96-bit (12-byte) string. These additional image quality flags have been defined by Unisys Corporation, the assignee of the present invention, and are based on measures generated by its NDP platform software and/or hardware (discussed in more detail below). Again, the particular order of the bits within the bit string, and the length of both the bits and bit string, are merely exemplary:

TABLE VI

| Bit | Description |
| --- | --- |
| Bit 20: Feed-check | 0 = "Feed-check" condition not detected, or condition not tested.<br>1 = "Feed-check" condition detected. |
| Bit 21: BOL Late | 0 = "BOL Late" condition not detected, or condition not tested.<br>1 = "BOL Late" condition has been detected. |
| Bit 22: Framing Error | 0 = "Framing Error" condition not detected, or condition not tested.<br>1 = "Framing Error" condition has been detected. |
| Bit 23: Below Minimum Document Height | 0 = A document height greater than the "Minimum Document Height" has been detected, or condition not tested.<br>1 = A document height lower than or equal to the "Minimum Document Height" Image Quality Threshold has been detected. |
| Bit 24: Exceeds Maximum Document Height | 0 = A document height lower than the "Maximum Document Height" has been detected, or condition not tested.<br>1 = A document height greater than or equal to the "Maximum Document Height" Image Quality Threshold has been detected. |
| Bit 25: Below Minimum Document Length | 0 = A document length greater than the "Minimum Document Length" has been detected, or condition not tested.<br>1 = A document length lower than or equal to the "Minimum Document Length" Image Quality Threshold has been detected. |
| Bit 26: Exceeds Maximum Document Length | 0 = A document length lower than the "Maximum Document Length" has been detected, or condition not tested.<br>1 = A document length greater than or equal to the "Maximum Document Length" Image Quality Threshold has been detected. |
| Bits 27-95 | 0 = Reserved. |

As set forth in Table VI, these additional image quality flag bits preferably include the following: image quality flag bit 20 representing the condition of feed-check (currently only available on high-speed Unisys NDP platforms such as the NDP850 and NDP2000, this condition can include any of the following, double document, over-length document, or under-spaced document(s)); image quality flag bit 21 representing beam-of-light (BOL) late (which occurs if, at the time that a camera is commanded to start looking for the leading edge of a document, the video background exceeded the maximum video background threshold, which would indicate that the camera is already receiving document data and, therefore, the document may not be framed correctly); image quality flag bit 22 representing a framing error (which occurs if the framing circuit has not detected the leading/trailing of the document within the maximum time allowed); bits 23 and 24 representing that the document height is below a minimum threshold or exceeds a maximum threshold, respectively; and, finally, bits 25 and 26 representing that the document length is below a minimum threshold or exceeds a maximum threshold, respectively. Flag bits 27-95 are reserved for future additional image quality flags that may be developed from measures generated from the Unisys NDP platform or other document processing platform, or for other image quality flags. In a preferred embodiment, these image quality flags are set to zero "0" if the image quality condition is not present or if the image was not tested for this condition. The flag is set to one "1" to indicate that that particular image condition is present. One skilled in the art will appreciate that these settings are merely exemplary and any similar flag settings may be used instead to represent the testing results of the image renditions.

The preferred file structure of IQF file 304 is thus as follows:

```
IQF_HEADER_STRUCTURE
    Annotation
    File_Name
    File_Directory
    Image_Quality_Metric_Thresholds
        Create_Image_Quality_Flag
        Transport_Type
        Image_Quality_Enabled_Flags
            X9.37_Image_Quality_Enabled_Flags
                X9.37_Quality_Flag_1
                X9.37_Quality_Flag_2
                ...
                X9.37_Quality_Flag_mm
            Unisys_Image_Quality_Enabled_Flags
                Unisys_Quality_Flag_1
                Unisys_Quality_Flag_2
                ...
                Unisys_Quality_Flag_nn
            [Reserved for Future Use]
```

```
            Image_Quality_Metric_1_Threshold
            Image_Quality_Metric_2_Threshold
            ...
            Image_Quality_Metric_pp_Threshold
            [Reserved for Future Use]
        [Reserved for Future Use]
        IQF_Version_Level
        Checksum
    END_IQF_HEADER_STRUCTURE
    IQF_RECORD_STRUCTURE
        .IDX_File_Offset
        Global_Image_Quality_Conditions_For_Document_D
            Global_Image_Quality_Flag_For_Front_Image_Document_D
            Global_Image_Quality_Flag_For_Rear_Image_Document_D
            Global_Image_Quality_Flag_For_Front_2_Image_Document_D
            Global_Image_Quality_Flag_For_Rear_2_Image_Document_D
            [Reserved for Future Use]
        Image_Quality_Conditions_For_FIM_Document_D
            ASCII_Global_X9.37_Image_Quality_FIM_Document_D
            ASCII_Image_Quality_Conditions_FIM_Document_D
                ASCII_Image_Quality_Condition_1_FIM_Document_D
                ASCII_Image_Quality_Condition_2_FIM_Document_D
                ...
                ASCII_Image_Quality_Condition_mm_FIM_Document_D
            Image_Quality_Bit_Fields_For_FIM_Document_D
                X9.37_Image_Quality_Bit_Field_Flags
                    X9.37_Quality_Flag_1
                    X9.37_Quality_Flag_2
                    ...
                    X9.37_Quality_Flag_mm
                    [Reserved for Future Use]
                Unisys_Image_Quality_Bit_Field_Flags
                    Unisys_Quality_Flag_1
                    Unisys_Quality_Flag_2
                    ...
                    Unisys_Quality_Flag_nn
                    [Reserved for Future Use]
        Image_Quality_Conditions_For_RIM_Document_D
        Image_Quality_Conditions_For_FI2_Document_D
        Image_Quality_Conditions_For_RI2_Document_D
        Reserved_For_Future_Expansion
    END_IQF_RECORD_STRUCTURE
``` where: "mm" represents the total number of X9.37_Image_Quality_Enabled_Flags, "nn" represents the total number of Unisys_Image_Quality_Enabled_Flags, and "pp" represents the total number of Image_Quality_Metric_Thresholds.

Unisys NDP Embodiment

Figure 8:
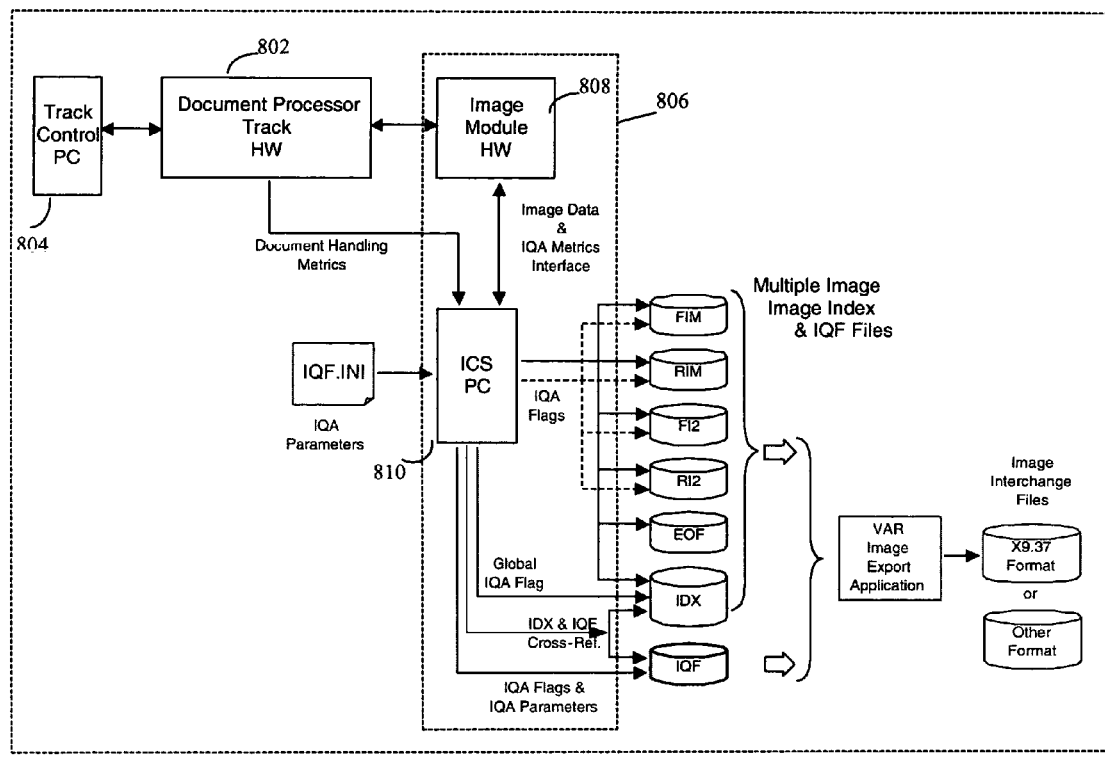
FIG. 8 illustrates an implementation of the image capture system with image quality assurance (IQA) of the present invention in the Unisys Network Document Processor (NDP) platform.

FIG. 8 illustrates a preferred embodiment of an implementation of the image capture system with image quality assurance (IQA) of the present invention on the Unisys Network Document Processor (NDP) platform. The Unisys NDP series, including the NDP 300/600, 850, 1150, 1600, 1825, and 2000 are all commercially available from Unisys Corporation, Unisys Way, Blue Bell, Pa., 19424. Only the portions of the platform relevant to the present invention will be discussed.

As seen in FIG. 8, documents are physically processed through the transport hardware 802 of a Unisys NDP document processors under the control of track control PC 804. Track control PC 804 provides sorter control of document transport hardware 802, and includes track applications, such as inclearings, proof of deposit, and remittance operations, and system software (not shown), which in a preferred embodiment of the present invention, is WINDOWS NT®, WINDOWS® 2000, or WINDOWS® XP-based system software. The system software preferably includes Unisys Common Application Programming Interface, or CAPI, which is a common application programming interface that enables the same application software to be used across multiple transport platforms.

Image capture subsystem 806 provides image server and capture capabilities and interfaces with the document transport hardware 802 to receive images moved by document transport 802 and to store them in appropriate files (e.g., FIM, RIM, FI2, RI2). Image capture subsystem 806 generally comprises both hardware and software, including imaging module hardware 808, having a camera system (not shown) for capturing images, and image capture server (ICS) PC 810 for processing and storing of the images.

In accordance with a preferred embodiment of the present invention, the image capture server (ICS) PC 810 receives the captured image data from imaging module hardware 808 (image capture process 202), processes the image data for storage (image file generation process 204), and then carries out the IQA Metric Generation Process 218, optional Document Metrics Process 220, IQA Rules Process 222, and IQF Record Generation process 228.

The metrics of the present invention are generated in real-time by the Unisys NDP platform and can be used to provide the image quality flags proposed by the X9.37 standard (as set forth above). The metrics generated by the Unisys NDP platform may originate from either the platform hardware (e.g., track control PC 804, image module hardware 808 ), or from system software (e.g., CAPI, ICS PC 810 software). According to the present invention, currently available metrics that might be considered either separately or in combination to generate image quality flags include the following hardware-generated metrics, such as: compressed image packet size; document image height and length; document skew; Beam-of-light (BOL) "late" signal; framing error; leading/trailing edge; feed check status (including piggyback items, over length items, document spacing errors); and compressor hardware errors. Software-generated metrics might include feed check detected; zero (0) byte images; comparison of document front and rear image dimensions; disk storage full (out of space to store image files); failure to store image; and CAPI document complete status.

An exemplary implementation of the structure of the IQF file 304 including descriptions for the NDP platform is attached hereto as Appendix B.

Retrieval of Image Quality Suspects

It will be appreciated from the foregoing that suspect images can easily be located by scanning through the record entries of IQF file 304. Retrieval of these suspect images is accomplished by using the IDX file offset field 602 in the image quality record 308 to index into the IDX file, which in turn, provide pointers into the image files. Alternatively, identification of the suspect images may be accomplished by using the image quality record index field 302 stored in the IDX record 310 to index into the image quality record 308 to determine which of the images are suspect.

Figure 10:
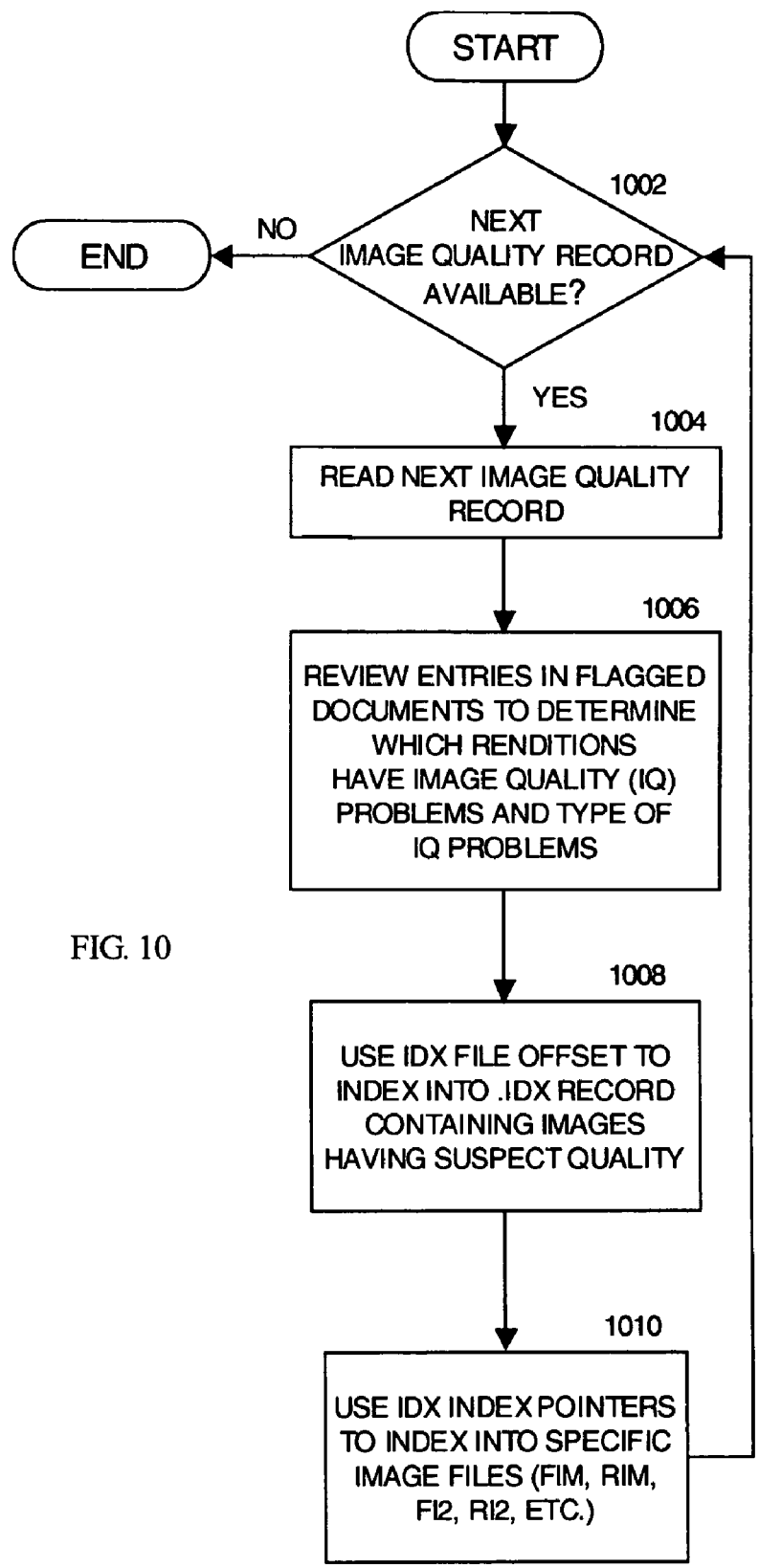
FIG. 10 illustrates a method of retrieving image quality suspects in the image capture system with image quality assurance (IQA) according to the present invention.

More particularly, FIGS. 9 and 10 (with reference to FIG. 3) illustrates one method of retrieving image quality suspects in the image capture system with image quality assurance (IQA) according to the present invention. The IQF file 304 is read by an imaging application (not shown) at 1002 to determine whether an image quality record 308 exists, indicating that at least one document in the particular batch in question was flagged as having one or more image defects. If no image quality record 308 exists, the process ends. If an image quality record 308 exists (1002), the image quality record is read at 1004. All entries in the record are reviewed by the imaging application to determine which image renditions have image problems as well as the type of image problems (1006). The imaging application will then use the IDX file offset 602 to index into the IDX record 310 containing the image(s) having suspect image quality (step 1008). Index pointers in the IDX file can then be used to index into the specific suspect image files (e.g., FIM, RIM, FI2, RI2) at step 1010. The process then returns to step 1002 to determine if more image quality records exist.

Figure 11:
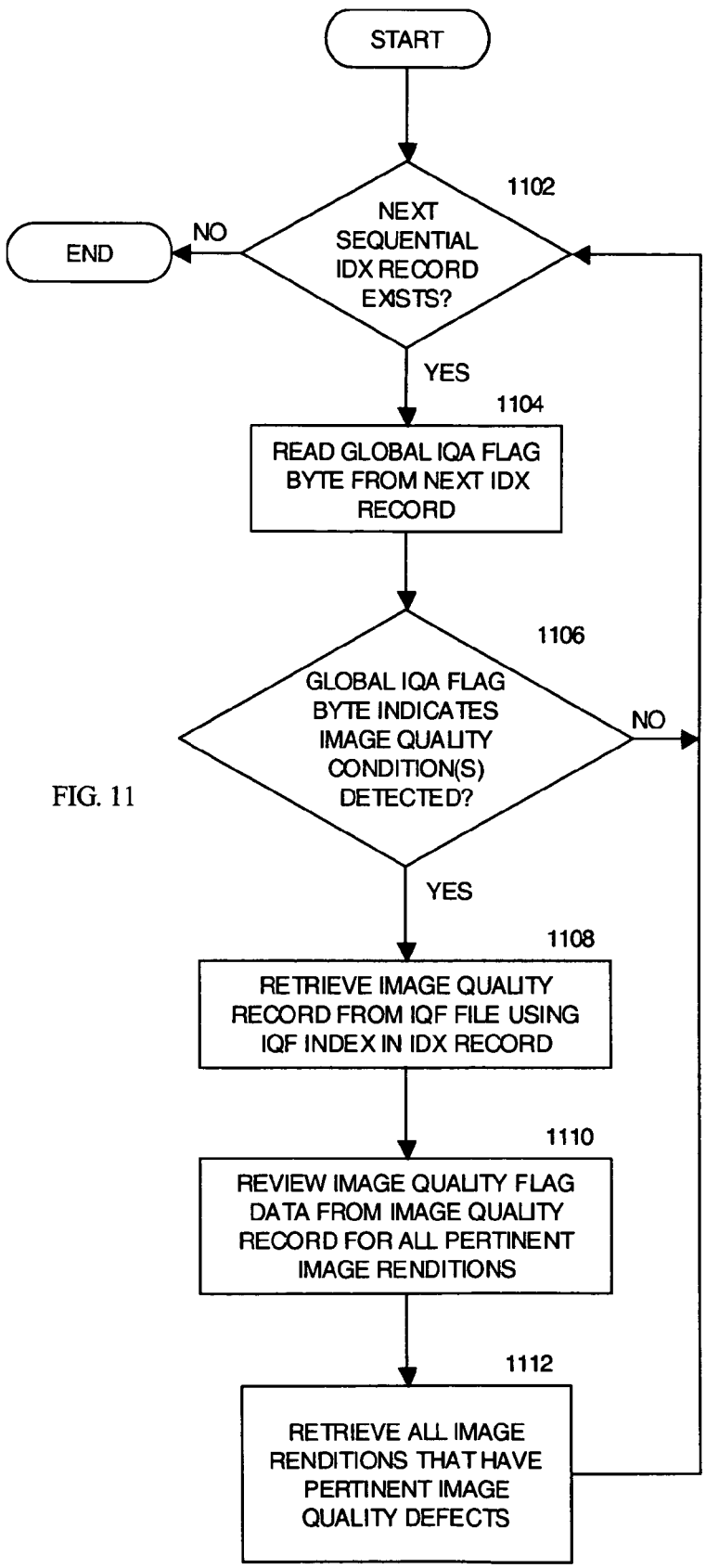
FIG. 11 illustrates an alternate method of retrieving image quality suspects in the image capture system with image quality assurance (IQA) according to the present invention; and, FIG. 12 illustrates an alternate post-image capture embodiment of an image capture system with image quality assurance (IQA) according to the present invention.

Alternatively, as shown in FIG. 11 (with reference to FIG. 3), for each record in the IDX file (1102) (one record for each document), the "global" image quality flag 300 in that IDX record can be read (1104) to see if that document has been checked for image quality (1106), and if so, whether all the images "passed" or one or more image quality conditions were detected. If the "global" image quality flag 300 in the IDX record field indicates at 1108 that no image quality conditions were detected, the process continues with the next document at 1102. If, however, the "global" image quality flag 300 in the IDX record indicates at 1106 that one or more image quality conditions were detected, the image quality record index field 302 is then used by the imaging application to index into the IQF file 304 to retrieve the image quality record for this document and determine which image renditions for this document have image quality conditions (1108). At 1110, the image quality flag data pertinent to the imaging application are then reviewed, and pertinent image renditions having image quality flags that are "set" are retrieved (1112).

Automated Image Quality Assurance (IQA) in a Post-Capture Imaging Environment

Figure 12:
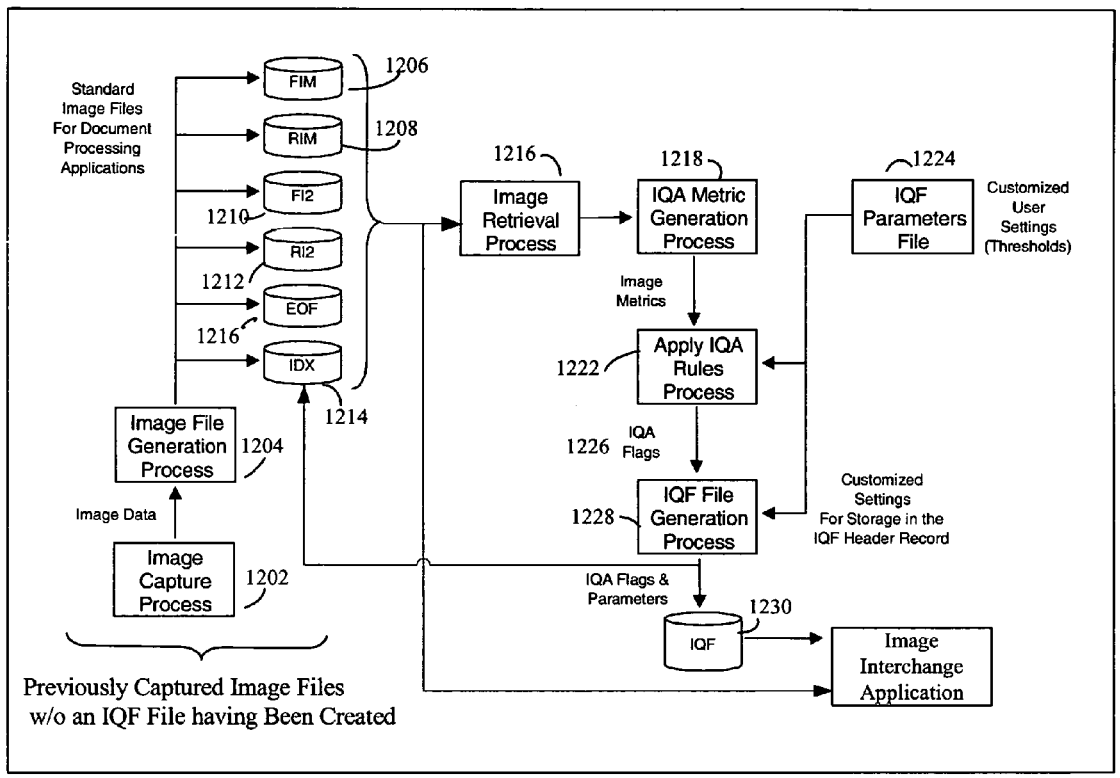

Referring to FIG. 12, an alternative implementation of the present invention is shown wherein the image quality assurance system and methodology is carried out in a post-image-capture environment. A post-image-capture image quality assurance system and methodology might be needed and/or desired to screen incoming images during check image interchange processes. In such instance, the IQF file 1230 is also created post-image capture.

Figure 2:
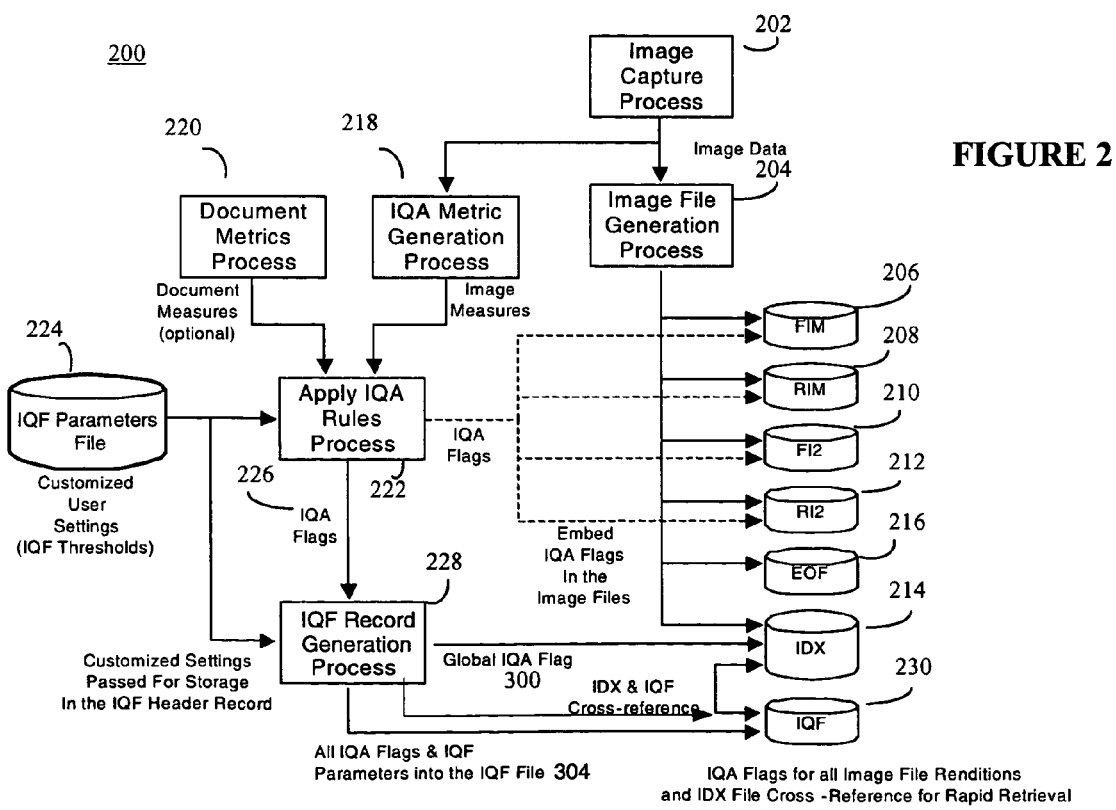
FIG. 2 illustrates a functional block diagram of an image capture system with image quality assurance (IQA) according to one embodiment of the present invention.

In accordance with this embodiment, the image capture process 1202 and image file generation 1204 are carried out in substantially the same manner as discussed in FIG. 2. Similarly captured front images (FIM) 1206, rear image (RIM) 1208, second front images (FI2) 1210, and second rear image (RI2) 1212, and end-of-file (EOF) semaphore file 1216 are substantially identical to their counterparts in FIG. 2. Modified image index file (IDX) 1214 is likewise substantially identical to its counterparts in FIG. 2.

Images stored in FIM 1206, RIM 1208, FI2 1210, and RI2 1212 are then retrieved and decompressed at 1216 in any manner known to those of skill in the art. The retrieved and decompressed image data is then analyzed by the IQA Metric Generation Process 1218 to provide selected image metrics that may be used to assess image quality of the captured images. The image metrics used in 1218 are comparable to those discussed in relation to FIG. 2, and may include any or all of the following: image dimensional data (e.g., height and width); compressed image packet size; image gray level histograms; document skew angle; hardware/software feed check errors; and/or other transport status/error detection information, and may be used alone or in any combination thereof to generate specific image quality "flags" (discussed in more detail below). Other image metrics that are known to those skilled in the art may also be included in the IQA Metric Generation Process 1218.

The selected image metrics provided at 1218 are then compared at IQA Rules Process 1222 using a selected image quality metric setting or threshold, or some combinations of image quality metric thresholds, from IQF parameter file 1224, in order to determine whether a particular image metric "passed" or "failed." As with IQF parameter file 224, IQF parameter file 1224 preferably includes at least customized image quality metric thresholds that have been predefined or preselected (e.g., by the manufacturer, the user, or a third party value-added reseller).

As with the embodiment of FIG. 3, should the retrieved and decompressed image data for any of the documents fail the predefined image quality metric threshold test (e.g., not equal or exceed the threshold) an IQA "flag" (1226) will be generated. This flag 1226 and the image quality metric thresholds from the IQF Parameter File 1224 will be used to generate at 1228 an IQF file. The IQF file generated at 1228 contains a record entry for each document in the batch that is suspected of having an image quality defect (i.e., one or more image quality flags 226 have been "set" for one or more of the images associated with that document). The IQF file 304 for that batch of documents is then stored at 1230 for later retrieval of image quality suspects, and the image index file (IDX) 1214 is preferably modified to indicate that image quality has been checked for that batch of documents. Image quality information is then made accessible to a document imaging application (not shown) by having the document imaging application "scan" only those record entries present in the IQF file.

It will be appreciated that the image quality assurance systems and methods of the present invention provide for the realization of automated IQA on image platforms with improved access speed to image quality suspects, and particularly those implementing the ASC X9.37 standard and its progeny. The image quality assurance systems and methods of the present invention provide a more efficient use of application processing time and provide a method to consolidate "common" image defects for each document independent of the image renditions being generated. Furthermore, the image quality assurance systems and methods of the present invention provide direct support for identifying temporal image quality defects and a consolidated summary of image quality defects associated with the batch of documents for which images have been captured. Finally, the image quality assurance systems and methods of the present invention allow for storing in the image quality flag file itself for easy referral, the information on the criteria and parameters used to determine the state of each image quality flag.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

APPENDIX A

Proposed X9.37—Image Quality Conditions:
1. Global Image Quality (is there any defect detected for this image)
2. Partial Image
3. Excessive Document Skew
4. Piggyback Image
5. Too Light or Too Dark
6. Streaks and or Bands
7. Below Minimum Image Size
8. Exceeds Maximum Image Size

APPENDIX B

IQF_Header_Record

| Name | Description |
| --- | --- |
| Annotation | Data specified by the CAPI iImgAnnotate or iImgAnnotateSA Property when the GoReadyToProcess Method was invoked. This Property defines the application annotation data that is stored in the header record of all future image files. The application can use this data to keep information such as business day, type of work, or run number. |
| FileName | DOS file name without extension. This is the name used during transport capture. |
| FileDirectory | Directory specified by the iImgImageDirectory Property when the GoReadyToProcess Method was invoked. This is the directory used during transport capture. |
| Image Quality Metric Thresholds | See "Image Quality Metric Thresholds" definition below. |
| Reserved | Reserved for future expansion |
| Version | Version Indicator. 16-bit integer indicating the version of the header record. Value is assigned as follows: |
| Checksum | Version 200 = Original version (compatible with version 200 of the IDX file). Addition of the first 10 32-bit unsigned integers into a 16-bit unsigned integer initialized to zero. |

Image_Quality_Metric_Thresholds
(100 bytes in IQF_Header_Record)

| Name | Description |
| --- | --- |
| Create Image Quality Flags | 0 = No<br>1 = Yes |
| Transport Type | 0 = Unknown<br>1 = 300 ips (NDP1600-NDP2000)<br>2 = 150 ips (NDP850-NDP1150)<br>3 = 100 ips downstream (NDP250-NDP600)<br>4 = 100 ips upstream (NDP250-NDP600)<br>5-255 = Reserved for future transports |
| Image Quality Enabled Flags | Defines the Quality Flags that have been enabled by the imaging institution. See "Image Quality Flags Enabled" bit patterns defined below for details. |
| Minimum CCITT Compressed Packet Size | Set the "Below Minimum Image Size" Quality Flag if the flag is enabled and if the CCITT image packet size is less than or equal to this value (in 100-byte units). |
| Maximum CCITT Compressed Packet Size | Set the "Exceeds Maximum Image Size" Quality Flag if the flag is enabled and if the CCITT image packet size is greater than or equal to this value (in 100-byte units). |
| Minimum Aux CCITT Compressed Packet Size | Set the "Below Minimum Image Size" Quality Flag if the flag is enabled and if the Auxiliary CCITT image packet size is less than or equal to this value (in 100-byte units). For transports fitted with Dual Filter cameras. |
| Maximum Aux CCITT Compressed Packet Size | Set the "Exceeds Maximum Image Size" Quality Flag if the flag is enabled and if the Auxiliary CCITT image packet size is greater than or equal to this value (in 100-byte units). For transports fitted with Dual Filter cameras. |
| Minimum JPEG Compressed Packet Size | Set the "Below Minimum Image Size" Quality Flag if the flag is enabled and if the JPEG image packet size is less than or equal to this value (in 100-byte units). |
| Maximum JPEG Compressed Packet Size | Set the "Exceeds Maximum Image Size" Quality Flag if the flag is enabled and if the JPEG image packet size is greater than or equal to this value (in 100-byte units). |
| Minimum Aux JPEG Compressed Packet Size | Set the "Below Minimum Image Size" Quality Flag if the flag is enabled and if the Auxiliary JPEG image packet size is less than or equal to this value (in 100-byte units). For transports fitted with Dual Filter cameras. |
| Maximum Aux JPEG Compressed Packet Size | Set the "Exceeds Maximum Image Size" Quality Flag if the flag is enabled and if the Auxiliary JPEG image packet size is greater than or equal to this value (in 100-byte units). For transports fitted with Dual Filter cameras. |

Image_Quality_Metric_Thresholds
(100 bytes in IQF_Header_Record)

| Name | Description |
| --- | --- |
| Minimum Document Height | Set the "Below Minimum Document Height" Quality Flag if the compressor detects a document height lower than or equal to this value (in 1/10 inch units). |
| Maximum Document Height | Set the "Exceeds Maximum Document Height" Quality Flag if the flag is enabled and if the compressor detects a document height greater than or equal to this value (in 1/10 inch units). |
| Minimum Document Length | Set the "Below Minimum Document Length" Quality Flag if the flag is enabled and if the compressor detects a document length lower than or equal to this value (in 1/10 inch units). |
| Maximum Document Length | Set the "Exceeds Maximum Document Length" Quality Flag if the flag is enabled and if the compressor detects a document length greater than or equal to this value (in 1/10 inch units). |
| Reserved | Reserved for future expansion |

IQF_Record_Structure (512 bytes)

| Name | Description |
| --- | --- |
| IDX Offset | Offset of this document in IDX file |
| Global Image Quality Conditions | Bit pattern indicating the image renditions that have reported image quality conditions. See the "Global Image Quality Conditions" definition below. |
| Front 1 Image Quality Conditions | Image quality conditions specific to the 1st "front image" rendition of the document. See the "Image Quality Conditions" definition below. |
| Rear 1 Image Quality Conditions | Image quality conditions specific to the 1st "rear image" rendition of the document. See the "Image Quality Conditions" definition below. |
| Front 2 Image Quality Conditions | Image quality conditions specific to the 2nd "front image" rendition of the document. See the "Image Quality Conditions" definition below. |
| Rear 2 Image Quality Conditions | Image quality conditions specific to the 2nd "rear image" rendition of the document. See the "Image Quality Conditions" definition below. |
| Reserved | Reserved for future expansion. |

Image_Quality_Conditions (33 bytes for each image rendition)

| Name | Description |
| --- | --- |
| Global Image Quality | An ASCII code that indicates whether the image rendition was tested for any of the conditions related to X9.37 image quality definitions.<br>'0' - The image was not tested for any of the image quality conditions.<br>'1' - The image was tested and one or more image quality conditions were reported.<br>'2' - The image was tested and no image quality conditions were reported. |
| Partial Image | An ASCII code that indicates if only a portion of the image rendition is represented digitally while the other portion is suspected to be missing or corrupt.<br>'0' - Test not done.<br>'1' - Condition present.<br>'2' - Condition not present |
| Excessive Image Skew | An ASCII code that indicates if the image skew exceeds an acceptable value. This value is specific to the imaging institution's own defined requirements and/or constraints.<br>'0' - Test not done.<br>'1' - Condition present.<br>'2' - Condition not present |
| Piggyback Image | An ASCII code that indicates if a "piggyback" condition has been detected. With a "piggyback" condition, the intended image may be extended, obscured, or replaced by image(s) of additional document(s). A piggyback occurs when two or more documents are fed together and captured as one document when only a single document should have been fed and captured.<br>'0' - Test not done.<br>'1' - Condition present.<br>'2' - Condition not present |
| Too Light Or Too Dark | An ASCII code that indicates if the image is too light or too dark. The value is specific to the imaging institution's own defined requirements and/or constraints.<br>'0' - Test not done.<br>'1' - Condition present.<br>'2' - Condition not present |
| Streaks And Or Bands | An ASCII code that indicates if the image is likely corrupted due to streaks and/or bands. Streaks and bands can be caused by such problems as dirt, dust, ink, or debris on a lens or in the optical path.<br>'0' - Test not done.<br>'1' - Condition present.<br>'2' - Condition not present |
| Below Minimum Image Size | An ASCII code that indicates if the size of the compressed image is below an acceptable value. The value is specific to the imaging institution's own defined requirements and/or constraints, and is defined by the "Minimum Compressed Packet Size" Image Quality Threshold for this image rendition.<br>'0' - Test not done.<br>'1' - Condition present.<br>'2' - Condition not present |
| Exceeds Maximum Image Size | An ASCII code that indicates if the size of the compressed image is above an acceptable value. The value is specific to the imaging institution's own defined requirements and/or constraints, and is defined by the "Maximum Compressed Packet Size" Image Quality Threshold for this image rendition.<br>'0' - Test not done.<br>'1' - Condition present.<br>'2' - Condition not present |
| Reserved | Reserved for emerging image quality technologies. |
| Reserved | Reserved for emerging image quality technologies. |
| Reserved | Reserved for emerging image quality technologies. |
| Reserved | Reserved for emerging image quality technologies. |

-continued

Image_Quality_Conditions (33) bytes for each image redention)

| Name | Description |
|---|---|
| Reserved | Reserved for emerging image quality technologies. |
| Reserved | Reserved for emerging image quality technologies. |
| Reserved | Reserved for emerging image quality technologies. |
| Reserved | Reserved for emerging image quality technologies. |
| Reserved | Reserved for emerging image quality technologies. |
| Reserved | Reserved for emerging image quality technologies. |
| Reserved | Reserved for emerging image quality technologies. |
| Reserved | Reserved for emerging image quality technologies. |
| Reserved | Reserved for emerging image quality technologies. |
| Image Quality Bit Fields | See definitions for "Image Quality Bit Fields" below. |

Image_Quality_Bit_Fields (96 bits for each image rendition)

| Bit | Description |
|---|---|
| Bit 0: Partial Image Flag | 0 = Entire image is present, or condition not tested.<br>1 = Portion of the image is suspected to be missing. |
| Bit 1: Excessive Document Skew Flag | 0 = Image skew does not exceed an acceptable value, or condition not tested.<br>1 = Image skew exceeds an acceptable value. |
| Bit 2: Piggyback Image Flag | 0 = Piggyback condition not present, or not tested.<br>1 = Piggyback condition present. |
| Bit 3: Too Light or Too Dark Flag | 0 = Too Light or Too Dark condition not present, or not tested.<br>1 = Too Light or Too Dark condition present. |
| Bit 4: Streaks and/or Bands Flag | 0 = Streaks and/or bands not detected, or not tested.<br>1 = Streaks and/or bands detected.. |
| Bit 5: Below Minimum Image Size Flag | 0 = The compressed image is not below an acceptable value, or condition not tested.<br>1 = The compressed image is below an acceptable value. |
| Bit 6: Exceeds Maximum Image Size Flag | 0 = The compressed image is not above an acceptable value, or condition not tested.<br>1 = The compressed image is above an acceptable value. |
| Bits 7-19 | 0 = Reserved |
| Bit 20: Feed-check | 0 = "Feed-check" condition not detected, or condition not tested.<br>1 = "Feed-check" condition detected. |
| Bit 21: BOL Late | 0 = "BOL Late" condition not detected, or condition not tested.<br>1 = "BOL Late" condition has been detected. |
| Bit 22: Framing Error | 0 = "Framing Error" condition not detected, or condition not tested.<br>1 = "Framing Error" condition has been detected. |
| Bit 23: Below Minimum Document Height | 0 = A document height greater than the "Minimum Document Height" has been detected, or condition not tested.<br>1 = A document height lower than or equal to the "Minimum Document Height" Image Quality Threshold has been detected. |
| Bit 24: Exceeds Maximum Document Height | 0 = A document height lower than the "Maximum Document Height" has been detected, or condition not tested.<br>1 = A document height greater than or equal to the "Maximum Document Height" Image Quality Threshold has been detected. |
| Bit 25: Below Minimum Document Length | 0 = A document length greater than the "Minimum Document Length" has been detected, or condition not tested.<br>1 = A document length lower than or equal to the "Minimum Document Length" Image Quality Threshold has been detected. |
| Bit 26: Exceeds Maximum Document Length | 0 = A document length lower than the "Maximum Document Length" has been detected, or condition not tested.<br>1 = A document length greater than or equal to the "Maximum Document Length" Image Quality Threshold has been detected. |
| Bits 27-95 | 0 = Reserved. |

What is claimed:

1. A document processing system comprising a document transport for moving a plurality of documents and at least one computer running system software that interfaces with the document transport to provide document control, the document processing system further comprising:
   an image capture subsystem connected to the document transport for capturing selected image metrics and at least one image rendition from the plurality of documents as they are moved by the document transport, the image capture subsystem determining if at least one of the selected image metrics for any of the at least one image rendition does not successfully compare against preselected image quality metric threshold values, generating an image quality flag for any of the at least one image rendition if it does not successfully compare, and creating in an image quality flag file, a record entry for each imaged document having at least one flagged image rendition, each record entry including information about the at least one flagged image rendition for that imaged document, whereby image defects in the plurality of documents can be identified by examining the record entries in the image quality flag file;
   wherein the image capture subsystem further creates an image index file that, for each document, provides pointers to associated images and includes a global image quality flag for indicating image quality test results for the document and an image quality record index field that points to the associated record entry, if any, in the image quality flag file; and
   wherein each record entry in the image quality flag file further includes a cross-reference to the corresponding part of the image index file for the document corresponding to that particular record entry.

2. The document processing system of claim 1, wherein the image capture subsystem comprises:
   imaging module hardware for capturing images; and,
   an image capture server for processing and storing the captured images.

3. The document processing system of claim 1, further comprising track hardware, wherein the track hardware provides selected document metrics from a plurality of documents as they are moved by the document transport, and further wherein the image capture subsystem determines if at least one of the selected document metrics for any of the documents does not successfully compare against preselected document metric threshold values, generates an image quality flag for any of the documents if it does not successfully compare, and creates in the image quality flag file, a record entry for each imaged document having at least one flagged document metric, wherein each record entry includes information about the at least one flagged document metric for that imaged document.

4. The document processing system of claim 2, wherein the image capture server:
  analyzes each of the at least one image rendition of each imaged document in an image quality metric generation process to provide selected image metrics;
  compares the selected image metrics for each of the at least one image rendition of each imaged document against preselected image quality metric threshold values;
  generates an image quality flag for any of the at least one image rendition of the plurality of imaged documents if at least one of the selected image metrics for that image rendition does not successfully compare against the preselected image quality metric threshold values; and,
  creates a record entry in an image quality flag file for each of the plurality of imaged documents having at least one flagged image rendition, the record entry including information about the selected image metrics of the at least one flagged image rendition for that imaged document, wherein the image defects in a plurality of imaged documents can be identified by examining the record entries in the image quality flag file.

5. The document processing system of claim 1, further comprising:
  captured image storage means for storing according to type of image rendition, the at least one image rendition captured by the image capture subsystem for each of the plurality of documents;
  image quality flag file storage storing the image quality flag file; and,
  image index file storage means for storing the image index file.

6. The document processing system of claim 5, wherein the captured image storage means includes first front image rendition storage.

7. The document processing system of claim 6, wherein the captured image storage means further includes first rear image rendition storage.

8. The document processing system of claim 7, wherein the captured image storage means further includes second front image rendition storage.

9. The document processing system of claim 8, wherein the captured image storage means further includes second rear image rendition storage.

10. The document processing system of claim 5, further comprising an imaging application executing in the image capture subsystem, wherein for each of the plurality of imaged documents, the method further comprising the step of:
  setting the global image quality flag for an image index file record, the record corresponding to an imaged document, in the image index file, the global image quality flag indicating that the corresponding imaged document has been checked for image defects.

11. A document processing system comprising:
  transport means for physically processing a plurality of documents;
  track control means for controlling the transport means; and,
  image capture subsystem means, including
    imaging module hardware for capturing selected image metrics and a plurality of image renditions from documents as they are moved by the document transport;
    an image capture server for receiving the captured selected image metrics and plurality of image renditions from the imaging module hardware, the image capture server including software running thereon, the software adapted to determine if at least one of the selected image metrics for any of the image renditions does not successfully compare against preselected image quality metric threshold values, to generate an image quality flag for any of the image renditions if it does not successfully compare, and to create an image quality flag file that contains a record entry for each imaged document having at least one flagged image rendition, wherein each record entry includes the at least one flagged image rendition for that imaged document;
  wherein the image capture software creates an image index file that, for each document, provides pointers to associated images and includes a global image quality flag for indicating image quality test results for the document and an image quality record index field that points to the associated record entry, if any, in the image quality flag file; and
  wherein each record entry in the image quality flag file further includes a cross-reference to the corresponding part of the image index file for the document corresponding to that particular record entry.

12. The document processing system of claim 11, wherein the transport means provides selected document metrics from a plurality of documents, and further wherein the image capture subsystem determines if at least one of the selected document metrics for any of the documents does not successfully compare against preselected document metric threshold values, generates an image quality flag for any of the documents if it does not successfully compare, and creates in the image quality flag file, a record entry for each imaged document having at least one flagged document metric, wherein each record entry includes information about the at least one flagged document metric for that imaged document.

13. The document processing system of claim 12, wherein the selected document metrics are selected from the group comprising information about the type and information about the physical dimensions of each of the plurality of imaged documents.

14. The document processing system of claim 13, wherein the selected document metrics include a beam-of-light (BOL) "late" signal.

15. The document processing system of claim 14, wherein the selected document metrics include a document spacing error signal.

16. The document processing system of claim 15, wherein the selected document metrics include a double document signal.

17. The document processing system of claim 12, further comprising:
  captured image storage for storing according to type of image rendition, the image renditions captured by the image module hardware for each of the plurality of documents;
  image quality flag file storage for storing the image quality flag file; and,
  image index file storage for storing the image index file.

* * * * *